United States Patent [19]

Put

[11] Patent Number: 4,911,841

[45] Date of Patent: Mar. 27, 1990

[54] BELT FILTER PRESS AND BELT FOR SAME

[75] Inventor: Frederick W. Put, Winterswijk, Netherlands

[73] Assignee: Strategic American Markets, Inc., Syracuse, N.Y.

[21] Appl. No.: 233,857

[22] Filed: Aug. 18, 1988

Related U.S. Application Data

[63] Continuation of Ser. No. 927,727, Nov. 7, 1986, abandoned.

[30] Foreign Application Priority Data

| | | | |
|---|---|---|---|
| Apr. 26, 1985 | [NL] | Netherlands | 8501208 |
| Apr. 28, 1986 | [EP] | European Pat. Off. | 86200736.6 |

[51] Int. Cl.[4] .......................... B30B 9/24; B01D 33/04

[52] U.S. Cl. .................................... 210/401; 200/400; 200/405; 200/DIG. 3; 100/118; 100/119; 100/153

[58] Field of Search ............... 210/386, 400, 401, 405, 210/DIG. 3; 100/118, 119, 120, 152, 153

[56] References Cited

U.S. PATENT DOCUMENTS

| | | | |
|---|---|---|---|
| 371,131 | 10/1887 | Eppley | 100/152 |
| 2,237,635 | 4/1941 | Saxe | 210/400 |
| 2,963,161 | 12/1960 | Holland | 210/DIG. 3 |
| 3,104,608 | 9/1963 | Ribbans | 100/152 |
| 3,821,928 | 7/1974 | Sugita | 210/401 |
| 3,840,122 | 10/1974 | Myers | 210/DIG. 3 |
| 3,971,310 | 7/1976 | Kondos et al. | 210/386 |

FOREIGN PATENT DOCUMENTS

| | | | |
|---|---|---|---|
| 285594 | 4/1913 | Fed. Rep. of Germany . | |
| 1162304 | 9/1958 | France | 100/118 |
| 461276 | 10/1968 | Switzerland . | |
| 1562437 | 3/1980 | United Kingdom . | |
| 2031294 | 4/1980 | United Kingdom . | |

*Primary Examiner*—W. Gary Jones
*Assistant Examiner*—Matthew O. Savage
*Attorney, Agent, or Firm*—Watson, Cole, Grindle & Watson

[57] ABSTRACT

A belt filter press comprising two co-operating, endless belts, particularly for manure, which according to the invention takes steps to enable liquid and solid substance to be better separated from each other. The pressure between the endless belts is increased, the longitudinal edges are sufficiently sealed and substance that is still too moist is subjected repeatedly to compression since it remains stuck to the upper endless belt and is carried to the intake of the belts.

9 Claims, 6 Drawing Sheets

FIG. 3
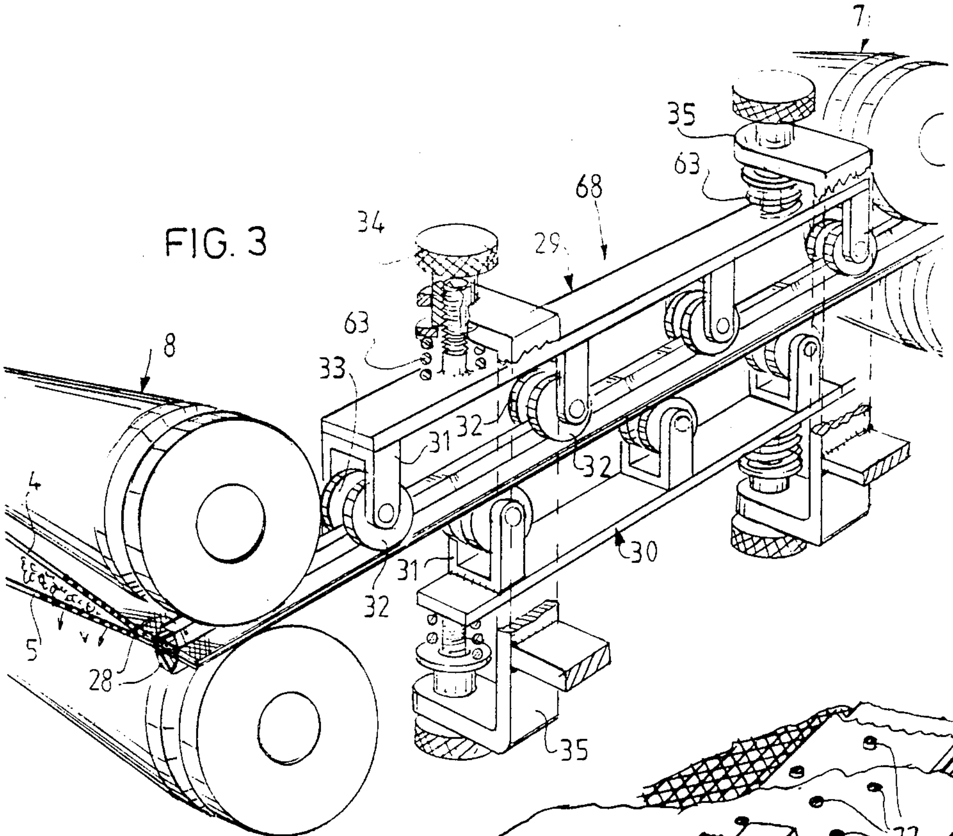
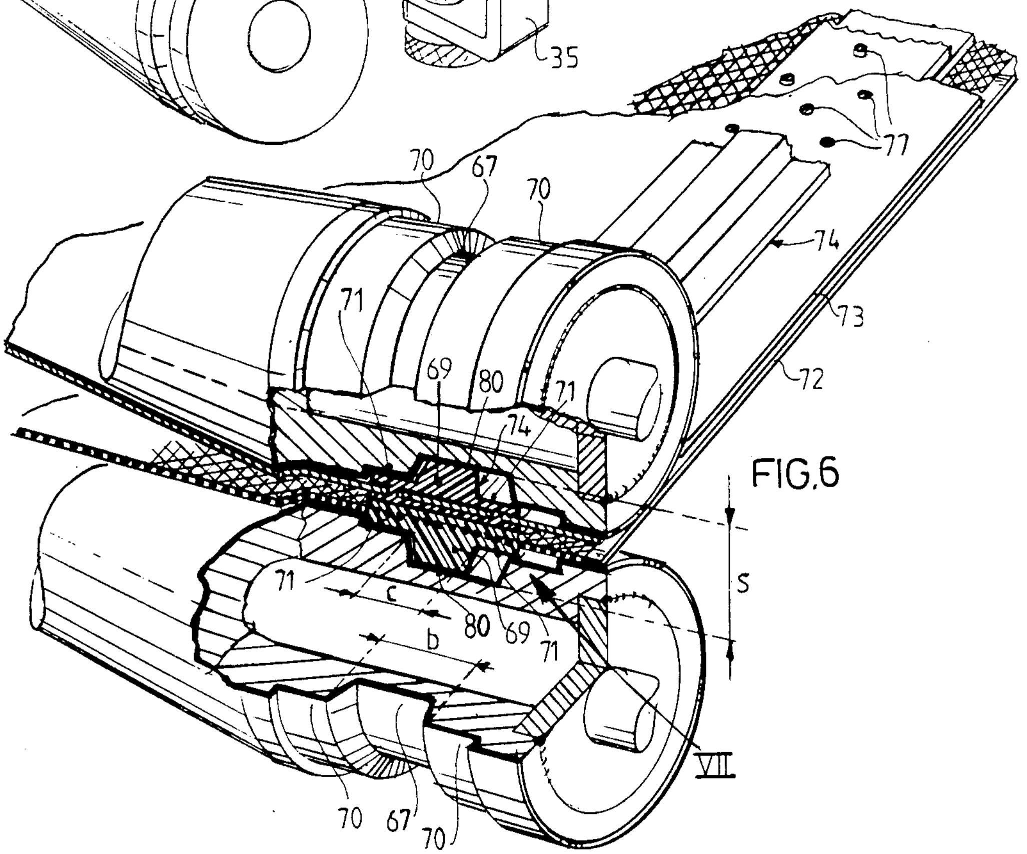
FIG.6

BELT FILTER PRESS AND BELT FOR SAME

This application in a continuation of application Ser. No. 927,727, filed 11/07/86, now abandoned.

BACKGROUND OF THE INVENTION

1. Field of the Invention

The invention relates to a belt filter press for separating liquids and solids.

The Prior Art

Such a belt filter press is known from NL-A-7611275. In this press an endless belt is guided by means of guide blocks which are each attached by means of fastening bolts to an attachment plate, which is located on the outside of the belt. Substance can hereby leak out along the sides between neighbouring plates. The pressure that can be built up in the space between the plates is therefore small, so that it is not effectively possible with this press to remove virtually all of the liquid from the substance. The endless belts are guided between upper and lower rollers which are arranged in alternately staggered positions. As a result the belts can move off the rollers, should hard objects be present in the substance to be processed, such as manure. The risk of damage to the belts is in principle counteracted as a result of this. However, in view of the fact that the belts in the press zone of the highest pressure are guided in a zig-zag pattern, the extent of deflection is very limited, so that the belts may nevertheless be damaged by hard objects.

The invention has for its purpose to provide a belt filter press with which a good separation between liquid and solid can be effected and whereby the belts can nonetheless have a considerable standing time.

SUMMARY OF THE INVENTION

According to the invention the filter belt assembly includes a liquid-permeable, endless lower drainage belt, a liquid-impermeable, endless upper pressure belt, a plurality of upper pressure rolls within the upper pressure belt and a plurality of lower pressure rolls within the lower. pressure belt, the upper and lower pressure rolls forming nip-defining pairs through which the upper and lower belts pass in a filtering run, first and second pairs of pressure rolls being mounted so as to cause the belts to move upwardly therebetween, and upper and lower guide rolls within the respective upper and lower guide rolls within the respective upper and lower belts to cause the belts to converge downwardly towards the first pair of pressure rolls. The pairs of pressure rollers are tapered towards their centers to provide decreasing gaps therebetween along the filtering run. The belts include contacting sealing strips along their lateral sides, and spring-biased guide means are provided between the pairs of pressure rolls to press the belts together.

The high pressure is realized by means of the decreasing gap area of successive pairs of rollers. The dry-pressing of the solid material is possible because material that is still not sufficiently dry remains stuck fast to the impermeable upper wall and is treated again in the following processing run, whereby the adhering layer becomes still thicker and is subjected as a result to a progressively stronger pressing action, until the adhering layer becomes so thick and is consequently pressed so dry that it no longer remains stuck to the impermeable belt and then drops off it. The sag in the rollers forces the substance inwards, that is, away from the belt walls towards a central zone. This inward displacement and the sealing strip together ensure that a considerable pressure can be built up in the press gap. The sealing strip can be attached together with the guide means as a profile on the belt in a simple but also robust manner. This belt has a long standing time since the sealing strip and guide means are firmly attached to the belt and the rollers can deflect away from each other because of the spring means, which allows hard objects the possibility of passing with little risk of damage to the belt.

The operative adjoining parts of both belts are preferably located at least partly in an upwardly inclined plane. The liquid then flows downwards towards the inlet, so that, when a pair of roller deflect away from each other during the passage of a hard object, only a little liquid will pass through this pair of rollers. The continuous filtration process is accelerated because the solid portions of the substance stuck between the parts are drawn through the pair of rollers while the filtrate pressed out of the substance flows back downwards over and along these parts. Furthermore, if the quantity of substance for filtration supplied is greater than the processing capacity of the pair of rollers, the excess of the substance for filtration likewise flows back downwards, thereby still remaining enclosed between both belts.

The angle of inclination of the plane preferably decreases in the processing direction.

Since more than one pair of rollers is present and the gap area of successive pairs of rollers decreases in the processing direction, the pressure on the substance for filtration is continuously increased. In this way is avoided that when a maximum filter pressure is applied the belts expand and possibly break.

A favourable embodiment of the belt filter press results if the rollers forming part of a pair of rollers are identical.

If the belt filter press features a filtrate-receiving bin arranged under the pair of rollers in the loop of the lower endless filter belt, the filtrate cannot come into contact with the lower backward running part of the lower filter belt, so that this lower backward running part can dry and the dried filter belt can later absorb liquid from the substance for filtration.

Mentioned and other characteristics will be explained on the basis of embodiments of the belt filter press according to the invention with reference to the annexed drawing.

BRIEF DESCRIPTION OF THE DRAWINGS

In the drawings,

FIG. 3 is detail III from FIG. 1, FIG. 6 shows detail VI from FIG. 5 on a larger scale, FIG. 7 detail VII from FIG. 6 on a still larger scale.

DETAILED DESCRIPTION OF THE PREFERRED EMBODIMENTS

Figure 1:
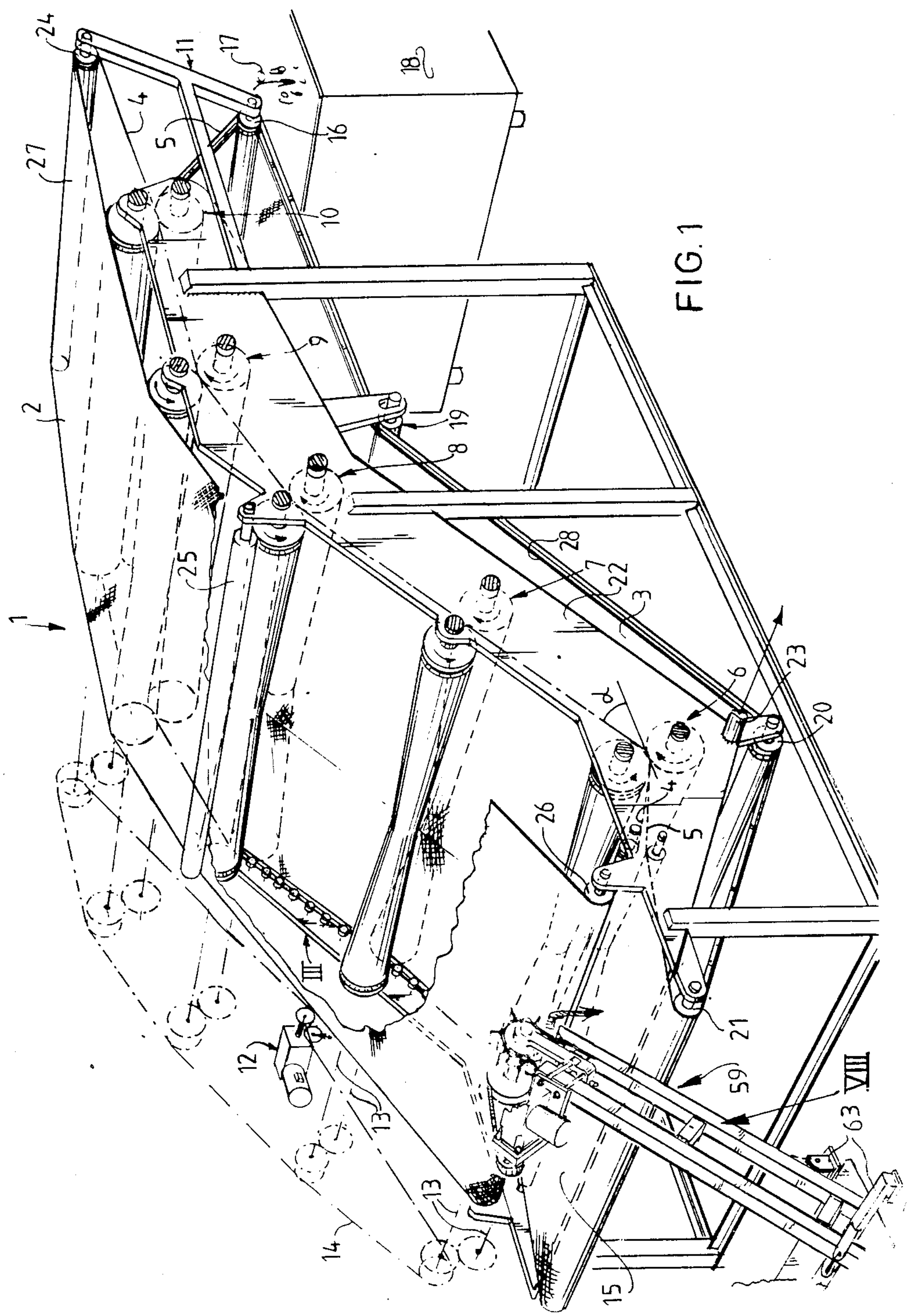
FIG. 1 shows a partly broken away perspective view of a belt filter press according to the invention for processing manure.

FIG. 1 shows a belt filter press 1 according to the invention. Belt filter press 1 comprises two endless filter belts, an upper filter belt 2 and a lower filter belt 3, of which adjoining respective parts 4 and 5 are guided jointly between five pairs of rollers 6–10.

The pairs of rollers 6–10 are all mounted for rotation in a press frame 11. Using a motor 12 the roller shafts 13 are driven jointly and synchronously in the direction shown via a chain 14.

From an intake opening 15 up to the first pair of rollers 6 both the parts 4 and 5 facing each other are each located in a downwardly inclined plane. From the pair of rollers 6 up to the pair of rollers 10 the parts 4 and 5 lie in an upwardly inclined and arcuate plane, of which the angle of slope with the horizontal decreases in the direction towards the pair of rollers 10.

From the pair of rollers 10 the parts 4 and 5 deviate away from each other. Part 5 is guided round a turn-over roll 16 and at the point of this turn-over roll 16 unloads the substance 17 remaining on the part 5 into a container 18. Via the guide rolls 19–21 filter belt 3 is guided in a loop as far as intake opening 15. Arranged in the loop formed by the lower filter belt 3 is a receiving bin 22 in which the filtrate pressed out of the substance 17 is collected and discharged via an outlet 23.

The upper part 27 of the upper filter belt 2 is guided over the guide rolls 24–26.

Filter belts 2 and 3 are each provided on their longitudinal edges with a profile 28 facing towards the rollers and the respective rollers are each provided with an annular groove 48 which co-operates with profile 28. Profile 28 is aranged on filter belts 2 and 3 by means of vulcanizing.

FIG. 3 shows in more detail the lateral guide 68 which is arranged preferably between the pairs of rollers 6–10. This lateral guide 68 consists for each part 4 and 5 of a guide member 29 and 30 respectively which is furnished with a number of rolls 32, each mounted for free rotation in a yoke 31 and each of which is provided with an annular groove 33 having a cross-sectional form complementary to the profile 28. The guide members 29 and 30 are each influenced by a spring force generated by springs 63, this force being adjustable with setting screws 34. Each setting screw 34 is guided slidably in a fork 35 attached to the frame 11. The rolls 32 of guide members 29 and 30 respectively slide relative to each other in contact with the respective profiles 28.

Figure 2:
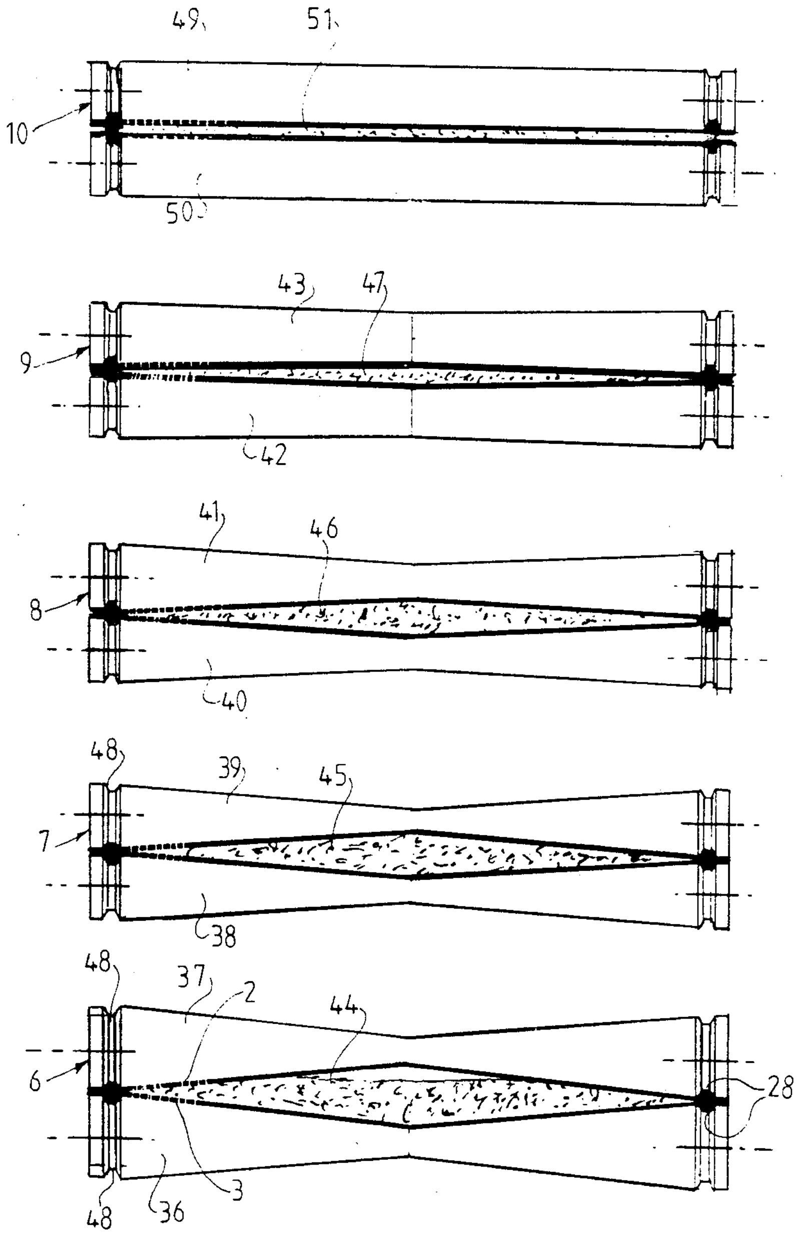
FIG. 2 shows upstream views from bottom to top in the processing direction of successive pairs of rollers of the belt filter press from FIG. 1.

FIG. 2 shows in more detail the form of the cooperating pairs of rollers 6–10. The rollers 36 and 37, 38 and 39, 40 and 41, 42 and 43 forming part of the pairs of rollers 6–9 are identical to each other and have a double cone form such that a gap 44–47 has a substantially diamond shape, while from pair 6 towards pair 9 the gap area decreases in size, and then such that the gap 44 of the pair of rollers 6 may possibly not be completely filled.

The profile 28 which is vulcanized onto filter belts 2 and 3 respectively so as to be turned towards the rollers is guided in an annular groove 48 having a sectional form complementary to profile 28.

Rollers 49 and 50 have a substantially cylindrical shape and the gap 51 has a substantially constant height over the whole width of the rollers.

The filter belt 2 consists preferably of woven material, for example textile, particularly linen. The textile is double woven (two over one) with 20 weft threads per cm. The upper belt is impermeable for liquid and has a smooth surface.

FIG. 1 relates to the de-watering of manure with a belt filter press 1 according to the invention.

Figure 4:
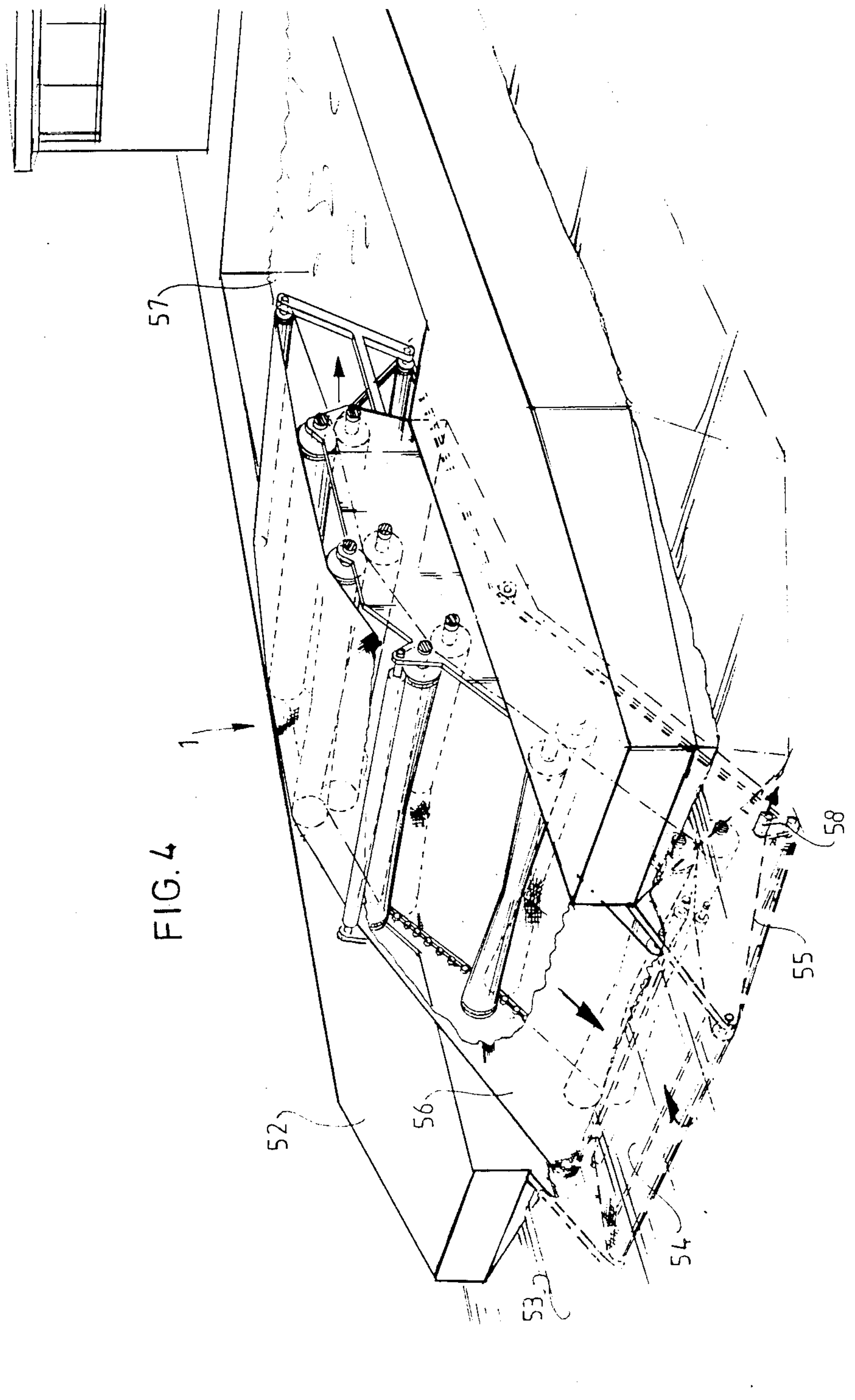
FIG. 4 shows a perspective view of a second embodiment of the belt filter press according to the invention for combatting oil pollution on open water.
Figure 8:
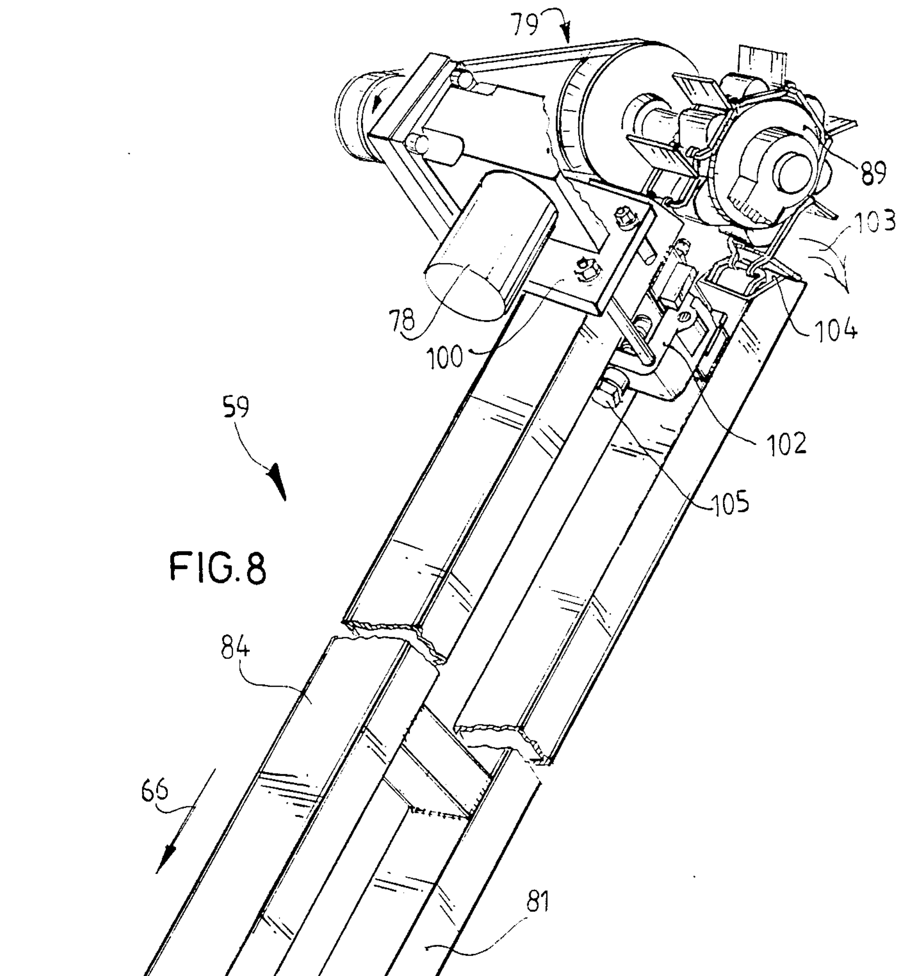
FIG. 8 shows detail VIII from FIGS. 1 and 5 on a larger scale.

FIG. 4 shows a second application of the belt filter press 1 according to the invention. The press 1 is arranged on a vessel 52 such that contamination floating on the open water 53 is taken up into the passage 54 between both filter belts 55 and 56. The contamination is discharged into a tank 57 and the filtered water drained off via the outlet 58.

Depending on the application of the filter band material and the substance for filtering, it may be desirable to provide the rollers with an elastic plastic lining.

Figure 5:
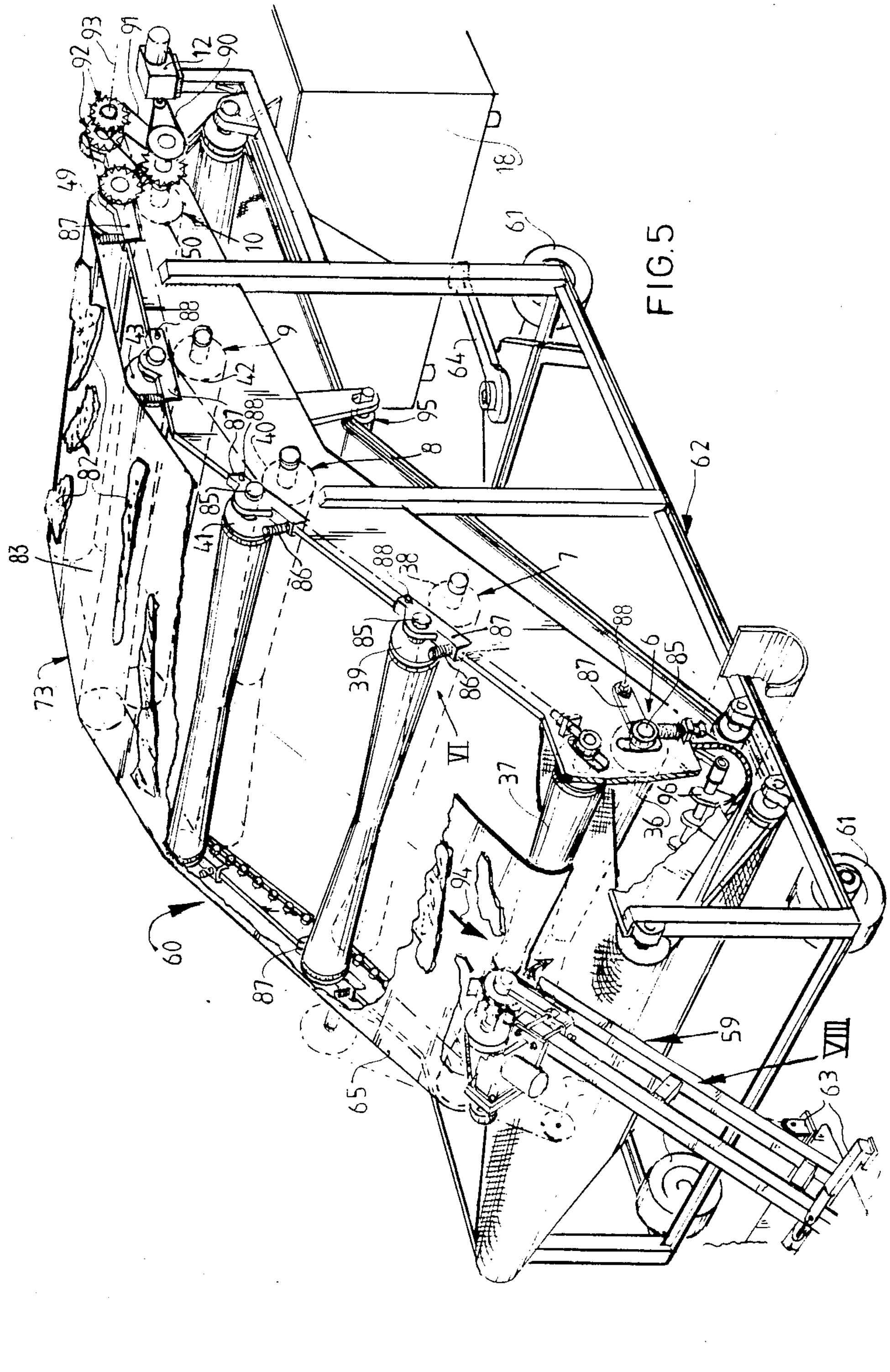
FIG. 5 is a perspective view of a third embodiment of a belt filter press according to the invention especially suitable for the separation of the solid and liquid constituents of manure.
Figure 7:
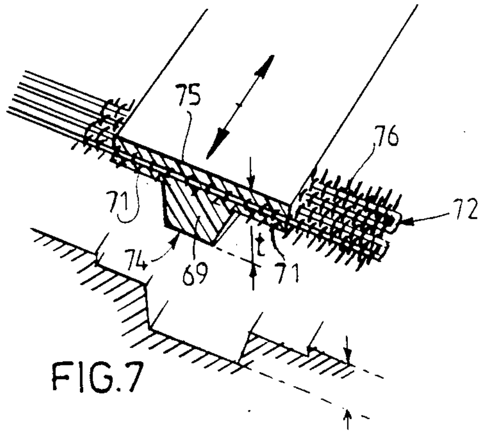

The belt filter press 60 in FIG. 5 has a frame 62 constructed on wheels 61 which can be pulled forward with a tow hook 64 behind a vehicle. In this way the same press can for example be used alternately by a number of cattle farming businesses. This belt filter press 60 also has pairs of rollers 6–10 arranged facing each other in the same plane with a decreasing gap width as shown in FIG. 2. At variance with the belt filter press 1 in FIG. 1, the rollers in FIG. 6 and 7 have ring grooves 67 of a width b which is substantially greater than the width c of the guide strip 69 of belts 72 and 73. Furthermore the rollers have annular cavities 70 adjacent to the ring grooves 67 for accommodating connecting flanges 71 of profiles 74. Profiles 74 are continuous, endless pieces of rubber attached by vulcanizing, material of which extends through the belts 72 and 73, so that the guide strip 69 on the outside of belts 72 and 73 together with the connecting flanges 71 situated there are linked as one whole with a sealing strip 75 located on the inside. The rubber runs through the meshes of the filter material 76 of the lower belt 72. Perforations 77 are arranged locally beforehand in the impermeable upper belt 73 so that during the vulcanizing attachment of profile 74 the rubber connects the sealing strip 75 with the guide strip 69 through these perforations 77. As a result of the wider ring groove 67 the edges of belts 72 and 73 can displace in transverse direction and can adapt to local sagging without great laterally directing forces being applied to guide strips 69. The belts 72 and 73 keep running properly guided on the pairs of rollers. The sum of the nominal height t of both belts is greater than the total distance s between the groove bottoms 80 so that in compressed state both the sealing strips 75 butt against each other.

FIG. 5 shows that substance 82 that is still too moist remains stuck to the backward running upper part 83, this occurring in practice with manure to a considerably greater extent than is drawn in FIG. 5. Only sufficiently dry substance drops at roller 49 - also turn-over roller - from the belt 73 as far as the lower belt 72 which then discharges it into the container 18. New substance will again adhere to substance 82 in the following processing run, whereby the layer of solid substance adhering to the belt 73 becomes even thicker. As it grows in thickness the layer is therefore squeezed increasingly strongly and becomes so dry that it no longer remains stuck to the smooth, liquid impermeable belt 73.

The rollers 49, 43, 41, 39 and 36 - in each case one roller of the pairs 6–10 - are mounted on shafts 85 which are forced by means of springs 86 towards the other roller of the same pair. For this purpose shafts 85 are mounted in pivoting arms 87 which can be pivoted relative to the frame 62 round swivel axles 88 in order that, when a hard object, for example a stone, is passing through, they pivot counter to the action of the springs 86 to prevent damage to the belts 72 and 73 and the belt filter press 60. Belts 72 and 73 are actuated by driving only the pair of rollers 49 and 50 of the last pair of rollers 10 from a motor 12. Via a drive gear 90 the motor 12 actuates roller 50 and this actuates the roller 49 via a drive gear 91 with sprocket chain wheels 92 which are mounted on the swivel axle 93 of pivoting arms 87 of this roller 49. Roller 37 is adjustable in the frame 62 in the direction of motion of belt 73 for the tensioning of this belt. A guide roll 95 is likewise mounted for adjustment in the frame 62 for the tensioning of the lower belt 72. Belts 72 and 73 are otherwise held tensioned mainly as a result of their being actuated from the last pair of rollers 10 having the smallest gap thickness. For manure processing the lower belt 72 has for example a mesh width in the order of magnitude of 495 micrometer or 35 micrometer.

In the receiving bin 22 is a rotating screw 96 which aerates the filtrate, thereby lessening the ammonia and odour dissemination.

The filter presses 1 and 60 of FIGS. 1 and 5 respectively each comprise a supply pump for supplying substance to be filtered, particularly manure of pigs and cows.

This supply pump 59 may be fixed to the frames 11 and 62 or may rest on the ground by means of supports 63, when it is loose from said frames 11 and 62. The supply pump 59 comprises an endless conveying member 65 driven in the direction of arrows 66 by means of an electric motor 78 through a decelerating rope drive gear 79, said conveying member moving through an elevating channel 81 and a return guide channel 84. Said channels 81 and 84 are fixedly interconnected. The conveying member 65 runs over chainwheels 89 and 101 and is constituted by chainlinks 97. Plate shaped carriers 98 are rigidly connected to said links 97 and have a periphery edge adapted to the internal cross section of the channels 81 and 84.

The carriers 98 are for instance square shaped exactly fitting in the internal section of the channel 81. At its entrance the channel 81 has a peripheral cutting edge 99 for cutting each time a conveyable portion from great agglomerations of manures possibly engaged in the manure reservoir. The conveying member 65 can be tensioned due to a support 100 being adjustable by means of adjusting means 102 comprising at least one adjusting belt 105, said support 100 supporting the motor 78, drive gear 79 and chainwheel 89.

The supply pump 59 is put through an opening 104 of a manure reservoir in inclined position such that the substance to be filtered falls into the inlet 15 of filter press 1 or 60 according to arrow 103.

The flow rate of the supply pump 59 can well be adapted to the flow rate of substance, which can be handled by the filter press. To this aim the drive velocity of the conveying member 65 is controlled by means of the electric motor 78 being of the speed variable type.

I claim:

1. A filter belt assembly for separating solid material and liquid, said assembly comprising a liquid-permeable, endless lower drainage belt, a liquid-impermeable, endless upper press belt, a frame which supports a plurality of upper pressure rolls, a plurality of upper guide rolls, a plurality of lower pressure rolls, and a plurality of lower guide rolls, said upper belt being movably mounted on said upper pressure rolls and said upper guide rolls and said lower belt being movably mounted on said lower pressure rolls and said lower guide rolls, said upper and lower pressure rolls being respectively mounted on said frame to form nip-defining pairs through which said upper and lower belts pass, a first pair of pressure rolls through which said belts pass defining an upstream end of a filtering run, an ultimate pair of pressure rolls defining a downstream end of said filtering run, and a second pair of pressure rolls being mounted on said frame relative to said first pair of pressure rolls so that said belts will move upwardly from said first paid to said second paid, each pair of pressure rolls being identically tapered towards their centers, such that at least side edges of said upper and lower belts are pressed together and gaps are provided between center portions thereof, said tapering of said pairs of pressure rolls decreasing for each pair of pressure rolls located in the downstream direction of said filtering run so that said gaps between the center portions of said belts decrease between sequential pairs of pressure rolls, one of said plurality of upper guide rolls and one of said plurality of lower guide rolls being mounted on said frame so as to respectively cause said upper and lower belts to converge downwardly towards said first pair of pressure rolls, thereby providing a lead-in run of said belts; second, third and fourth lower guide rolls being mounted on said frame to cause said lower belt to move in a generally V-shaped configuration below said first pair of pressure rolls and form a drainage trough; and a fifth of said guide rolls being mounted on said frame to provide a discharge end of said lower belt, feed means for feeding a mixture of solid material and liquid into said lead-in run, and drive means driving the upper and lower belts so as to circulate between said pressure rolls in the direction of said downstream end of said filtering run, mixtures of solid material and liquid supplied to said lead-in run of said belts being retained between said belts and subjected to increasing pressure as said belts pass between sequential pairs of pressure rolls along said filtering run, liquid being drained through said lower belt and towards said drainage trough and solid material being retained on the upper belt and returned to said lead-in run and through said filtering run until sufficiently dry be retained on said lower belt and discharged at said discharge end of said lower belt.

2. A filter belt assembly as defined in claim 1, wherein said lower drainage belt defines an outer surface which faces said upper press belt in said filtering run and an opposite inner surface, wherein said upper drainage belt defined an outer surface which faces said lower drainage in said filtering run and an inner surface, and wherein the outer surfaces of said lower drainage belt and said upper press belt include cooperating sealing strips on opposite lateral sides thereof.

3. A filter belt assembly as defined in claim 2, wherein the inner surfaces of said lower drainage belt and said upper press belt include guiding strips on opposite lateral sides thereof.

4. A filter belt assembly as defined in claim 3, wherein each of said upper pressure rolls includes annular grooves at opposite ends thereof in which a respective guiding strip extends.

5. A filter belt assembly as defined in claim 3, including first lateral guides mounted on said frame so as to be located between an adjacent pair of upper pressure rolls and cooperable with said upper press belt, and second lateral guides mounted on said frame so as to be located between an adjacent pair of lower pressure rolls and cooperable with said lower drainage belt.

6. A filter belt assembly as defined in claim 5, wherein each of said first lateral guide comprises a guide plate mounting grooves rollers in which a respective guiding strip of said upper press belt extends and each of said second lateral guides comprises a guide plate mounting grooved rollers in which a respective guiding strip of said lower drainage belt extends.

7. A filter belt assembly as defined in claim 6, wherein the grooved rollers of said second lateral guides are offset relative to the grooved rollers of said first lateral guides.

8. A filter belt assembly as defined in claim 6, wherein each of said first lateral guides includes spring means to bias the guide plate and groove rollers thereof toward the upper press belt and each of said second lateral guides includes spring means to bias the guide plate and grooved rollers thereof toward the lower drainage belt, thereby pressing said upper press belt and said lower drainage belt together.

9. A filter belt assembly as defined in claim 8, wherein the grooves in the grooved rollers of said first lateral guides are wider than the guiding strips of said upper press belt and the grooves in the grooved rollers of said second lateral guides are wider than the guiding strips of said lower drainage belt, such that said upper press belt and said lower drainage belt can laterally shift and accommodate the accumulation of solid material therebetween without creating undue tension in said belts.

* * * * *